United States Patent
Di Pinto et al.

(10) Patent No.: US 11,722,504 B2
(45) Date of Patent: Aug. 8, 2023

(54) METHOD AND APPARATUS FOR DETECTING ANOMALIES OF A DNS TRAFFIC

(71) Applicant: Nozomi Networks Sagl, Mendrisio (CH)

(72) Inventors: Alessandro Di Pinto, Malnate (IT); Moreno Carullo, Gavirate (IT); Andrea Carcano, San Francisco, CA (US); Mario Marchese, Genoa (IT); Fabio Patrone, Genoa (IT); Alessandro Fausto, Savignona (IT); Giovanni Battista Gaggero, Genoa (IT)

(73) Assignee: Nozomi Networks Sagl, Mendrisio (CH)

( * ) Notice: Subject to any disclaimer, the term of this patent is extended or adjusted under 35 U.S.C. 154(b) by 256 days.

(21) Appl. No.: 17/134,336

(22) Filed: Dec. 26, 2020

(65) Prior Publication Data
US 2022/0210170 A1 Jun. 30, 2022

(51) Int. Cl.
*H04L 61/4511* (2022.01)
*H04L 9/40* (2022.01)

(52) U.S. Cl.
CPC ...... *H04L 63/1425* (2013.01); *H04L 61/4511* (2022.05); *H04L 63/1416* (2013.01); *H04L 63/1441* (2013.01)

(58) Field of Classification Search
CPC .......... H04L 63/1425; H04L 61/4511; H04L 63/1416; H04L 63/1441; H04L 2463/144; H04L 41/0636; H04L 43/16; H04L 47/2441; G06N 3/02; G06N 5/003; G06N 7/005; G06N 20/10; G06N 20/20
See application file for complete search history.

(56) References Cited

U.S. PATENT DOCUMENTS

| | | | |
|---|---|---|---|
| 2011/0185425 A1* | 7/2011 | Lee .................... | H04L 63/1416 726/23 |
| 2017/0295196 A1* | 10/2017 | Arnell ................ | H04L 61/4511 |
| 2018/0295142 A1* | 10/2018 | Manadhata ........... | H04L 69/22 |

(Continued)

*Primary Examiner* — Farid Homayounmehr
*Assistant Examiner* — Mudasiru K Olaegbe
(74) *Attorney, Agent, or Firm* — Jason L DeFrancesco

(57) ABSTRACT

The present invention relates to a method and an apparatus for detecting anomalies of a DNS traffic in a network comprising analysing, through a network analyser connected to said network, each data packets exchanged in the network, isolating, through the network analyser, from each of the analysed data packets the related DNS packet, evaluating, through a computerized data processing unit, each of the DNS packets generating a DNS packet status, signaling, through the computerized data processing unit, an anomaly of the DNS traffic when the DNS packet status defines a critical state, wherein the evaluating further comprises assessing, through the computerized data processing unit, each of the DNS packet by a plurality of evaluating algorithms generating a DNS packet classification for each of the evaluating algorithms, aggregating, through the computerized data processing unit, the DNS packet classifications generating the DNS packet status, and wherein the critical state is identified when the DNS packet status is comprised in a critical state database stored in a storage medium.

13 Claims, 2 Drawing Sheets

(56) References Cited

U.S. PATENT DOCUMENTS

| | | | |
|---|---|---|---|
| 2019/0052650 A1* | 2/2019 | Hu | H04L 63/145 |
| 2020/0112574 A1* | 4/2020 | Koral | G06F 16/245 |
| 2020/0195669 A1* | 6/2020 | Karasaridis | H04L 63/10 |
| 2020/0204574 A1* | 6/2020 | Christian | G06F 18/23 |
| 2021/0073661 A1* | 3/2021 | Matlick | G06N 20/00 |
| 2021/0258325 A1* | 8/2021 | Meyer | H04L 61/4511 |
| 2021/0266293 A1* | 8/2021 | Liu | H04L 61/5007 |
| 2021/0266331 A1* | 8/2021 | Meshi | H04L 63/0263 |

* cited by examiner

METHOD AND APPARATUS FOR DETECTING ANOMALIES OF A DNS TRAFFIC

FIELD OF INVENTION

The present invention relates to the field of security methods and security apparatus in a DNS traffic analysis. In particular, the present invention relates to a method for detecting anomalies of a DNS traffic. In a further aspect, the present invention relates to an apparatus for detecting anomalies of a DNS traffic.

BACKGROUND ART

The Domain Name System (DNS) is a hierarchical and decentralized naming system for computers, services, or other resources connected to the Internet or a private network. It associates various information with domain names assigned to each of the participating entities. Most prominently, it translates more readily memorized domain names to the numerical IP addresses needed for locating and identifying computer services and devices with the underlying network protocols. The Domain Name System also specifies the technical functionality of the database service that is at its core. It defines the DNS protocol, a detailed specification of the data structures and data communication exchanges used in the DNS, as part of the Internet Protocol Suite. A DNS name server is a server that stores the DNS records for a domain; a DNS name server responds with answers to queries against its database.

Despite its original function as a domain name to IP address mapping, DNS protocol is also used to support a variety of Internet services, among which Email Delivery, Load Balancing and Content Delivery/Distribution Network, as well as for malicious purposes. The core DNS functionality is defined in the publication from the Internet Society (ISOC) and its associated bodies named Request for Comments (RFC) 1034 and 1035.

Nevertheless, DNS queries and answers can be utilized to create covert channels able to bypass firewalls that do not implement DNS packet inspection. Several open-source tools for implementing a DNS tunnel attack are available on the Internet at this scope, among which Iodine, DeNiSe, DET, dnscat2, OzymanDNS, ReverseDNSShell, TCP-over-DNS could be named.

Moreover, different malwares utilize this technique to implement a command-and-control covert channel, among which Morto Worm, FeederBot, PlugX, FrameworkPOS, Wekby, BernhardPOS, JAKU, MULTIGRAIN, DNSMessenger could be named.

DNS inspection is necessary to prevent covert channels. Accordingly, many approaches have been developed in the last years for automatically monitoring DNS traffic. Most of these state-of-the-art approaches usually start from extracting features from each single packet collected from a node of a network and then make use of Machine Learning (ML) algorithms in order to automatically detect covert channels in DNS traffic from these features.

The aforementioned approaches could be grouped into different families according to the set of network traffic over which the features are extracted. The "Single-packet-based" approach, or "Query-based approaches", try to discover covert channels analysing property related to the queries regardless of the interactions between DNS client/DNS server. The "Transaction-based" approach tries to discover covert channels analysing properties related to the DNS request/response transactions. The "Domain-based" approach collects all the packets that are sent to a specific second level domain over a period of time or a specific number of samples and computes the features over this group of packets. Finally, the "IP-based" approach collects all the packets that are sent by a specific IP address and computes the features over this group of packets.

For each family, different features can be extracted and different ML algorithms can be used for the classification. In this regard, while approaches within a family have different characteristics and can have different efficiency in detecting the same attack tool, their output is related to the same context. Instead, different outcomes are obtained comparing multiple approaches belonging to different families. For example, by implementing two different "Domain-based" approaches the outcomes return information on the nature of the analysed domain which are comparable to each other, but the same information is hardly comparable with the outcome of an "IP-based" approach that returns information on the possible compromise of a machine of the network.

Nevertheless, each approach presents its unique advantages and drawbacks, and it is often specialized in detecting a small portion of DNS misuses.

It would therefore be desirable to have a method and an apparatus capable to discover different types of covert channels based on DNS misuse. Furthermore, it would be desirable to have a method and an apparatus capable to manage DNS in a complete manner devoid of a rigid standardization Finally, it would be desirable to have a scalable method and an apparatus capable to manage complex evaluation of DNS traffic.

BRIEF DESCRIPTION OF THE INVENTION

The object of the present invention is to provide a method for detecting anomalies of a DNS traffic capable of minimizing the aforementioned drawbacks.

According to the present invention is described, therefore, a method for detecting anomalies of a DNS traffic in a network as described in the appended claims.

The method for detecting anomalies of a DNS traffic in a network comprises:
analysing, through a network analyser connected to the network, each data packets exchanged in the network;
isolating, through the network analyser, from each of the analysed data packets the related DNS packet;
evaluating, through a computerized data processing unit, each of the DNS packets generating a DNS packet status;
signaling, through the computerized data processing unit, an anomaly of the DNS traffic when the DNS packet status defines a critical state;
wherein said evaluating further comprises:
assessing, through the computerized data processing unit, each of the DNS packets by a plurality of evaluating algorithms generating a DNS packet classification for each of the evaluating algorithms;
aggregating, through the computerized data processing unit, the DNS packet classifications generating the DNS packet status; and
wherein the critical state is identified when the DNS packet status is comprised in a critical state database stored in a storage medium.

The method according to the present invention therefore allows to identify a big portion of DNS misuse through a plurality of evaluating algorithms taking benefits from all evaluating algorithms and minimizing the related drawbacks.

In an embodiment, the isolating further comprises extracting, through the computerized data processing unit, all the features from each of the DNS packet,
wherein the assessing further comprises defining, through the computerized data processing unit, a plurality of family subsets of the features, and
wherein each of the plurality of evaluating algorithms generates a DNS packet classification from a sole family subset.

In this way, the method allows to define different classifications according to the different families of evaluating algorithms used.

In an embodiment, the aggregating further comprises generating, through the computerized data processing unit, a DNS family status grouping the DNS packet classifications of a same family subset according to a predefined family-logic evaluation, and
wherein the aggregating further comprises generating, through the computerized data processing unit, the DNS packet status grouping the DNS family status according to a predefined packet-logic evaluation.

Therefore, the method according to the present invention allows to aggregate evaluation of different nature made up from different families of evaluating algorithms used.

In an embodiment, the predefined packet-classification evaluation comprises a majority voting evaluation,
wherein the DNS packet status is defined by the status of the majority number of the DNS family status, and wherein the critical state is identified when the majority number of the DNS family status relates to the critical status.

Therefore, the majority voting evaluation allows to equally balance each of the evaluating algorithms involved.

In an embodiment, the predefined packet-classification evaluation comprises a score voting evaluation,
wherein a score is assigned to the DNS packet classifications and wherein the DNS packet status is defined by the status of the greater score by summing homogeneous statuses, and wherein the critical state is identified when the greater score relates to the critical status.

By scoring each DNS packet classification, it is possible to define a different weight, and importance as well, to each evaluating algorithms involved.

In an embodiment, the predefined packet-classification evaluation comprises an evil-win evaluation,
wherein the DNS packet status is defined by a selected status if at least one DNS family status corresponds to the selected status, and
wherein the critical state is identified when the selected status relates to the critical status.

The evil-win evaluation approaches with the stronger identification of a critical status, wherein a high false positive rate can be tolerated.

In an embodiment, the evaluating algorithms comprise at least one algorithm of Query-based approach type,
wherein the assessing further comprises defining, through the computerized data processing unit, a Query-based subset of the features, and
wherein each of the plurality of evaluating algorithms of a Query-based approach type generates a DNS packet classification from one or more features of the Query-based subset.

In an embodiment, the algorithms of a Query-based approach type comprise at least one of the Isolation Forest algorithm, the Support Vector Machine algorithm, the J48 algorithm, the Naive Bayes algorithm, the Logistic Regression algorithm, and the K-means algorithm.

In an embodiment, the evaluating algorithms comprise at least one algorithm of a Transaction-based approach type,
wherein the assessing further comprises defining, through the computerized data processing unit, a Transaction-based subset of the features, and
wherein each of the plurality of evaluating algorithms of a Transaction-based approach type generates a DNS packet classification from one or more features of the Transaction-based subset.

In an embodiment, the algorithms of a Transaction-based approach type comprise at least one of the K-nearest Neighbor algorithm, the Multilayer Perceptron, and the Support Vector Machine algorithm.

In an embodiment, the evaluating algorithms comprise at least one algorithm of a Domain-based approach type,
wherein the assessing further comprises defining, through the computerized data processing unit, a Domain-based subset of the features, and
wherein each of the plurality of evaluating algorithms of a Domain-based approach type generates a DNS packet classification from one or more features of the Domain-based subset.

In an embodiment, the algorithms of a Domain-based approach type comprise the Isolation Forest algorithm.

In an embodiment, the evaluating algorithms comprise at least one algorithm of an IP-based approach type,
wherein the assessing further comprises defining, through the computerized data processing unit, an IP-based subset of the features, and
wherein each of the plurality of evaluating algorithms of an IP-based approach type generates a DNS packet classification from one or more features of the IP-based subset.

In an embodiment, the algorithms of an IP-based approach type comprise at least one of the Decision Tree algorithm and the Support Vector Machine algorithm.

In a further aspect, the object of the present invention is to provide an apparatus for detecting anomalies of a DNS traffic capable of minimizing the aforementioned drawbacks.

According to the present invention is described, therefore, an apparatus for detecting anomalies of a DNS traffic in a network as described in the appended claims.

The apparatus for detecting anomalies of a DNS traffic in a network comprises a network analyser to be connected to a network, computerized data processing unit operatively connected to the network analyser and storage medium operatively connected to the data computerized data processing unit,
wherein the network analyser, in use, analyses each data packets exchanged in the network and isolates from each of the analysed data packets the related DNS packet,
wherein the computerized data processing unit, in use, evaluates each of the DNS packets generating a DNS packet status, and signals an anomaly of the DNS traffic when the DNS packet status defines a critical state,
wherein the storage medium stores a plurality of evaluating algorithms and a critical state database,
wherein the computerized data processing unit assesses each of the DNS packets by the plurality of evaluating algorithms, generating a DNS packet classification for each of the evaluating algorithms, and aggregates the DNS packet classifications generating the DNS packet status; and wherein the computerized data processing unit identifies a critical state when the DNS packet status is comprised in the critical state database.

The apparatus according to the present invention therefore allows to identify a big portion of DNS misuse through a plurality of evaluating algorithms taking benefits from all evaluating algorithms and minimizing the related drawbacks.

DESCRIPTION OF THE FIGURES

These and further features and advantages of the present invention will become apparent from the disclosure of the preferred embodiment, illustrated by way of a non-limiting example in the accompanying figures, wherein.

DETAILED DESCRIPTION OF THE INVENTION

The present invention relates to a method for detecting anomalies in a network, in particular with regard to DNS traffic. The present invention is further related to an apparatus for detecting anomalies in a network, in particular with regard to DNS traffic.

The method and the apparatus according to the present invention find a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management.

The term "data packet" means, in the present invention, each finite and distinct sequence of data transmitted in a network. Preferably, these data are in digital format and defined by a sequence of bits.

The term "evaluating algorithm" means, in the present invention, an algorithm able to generate a DNS traffic classification over one or more data packets.

Figure 1:
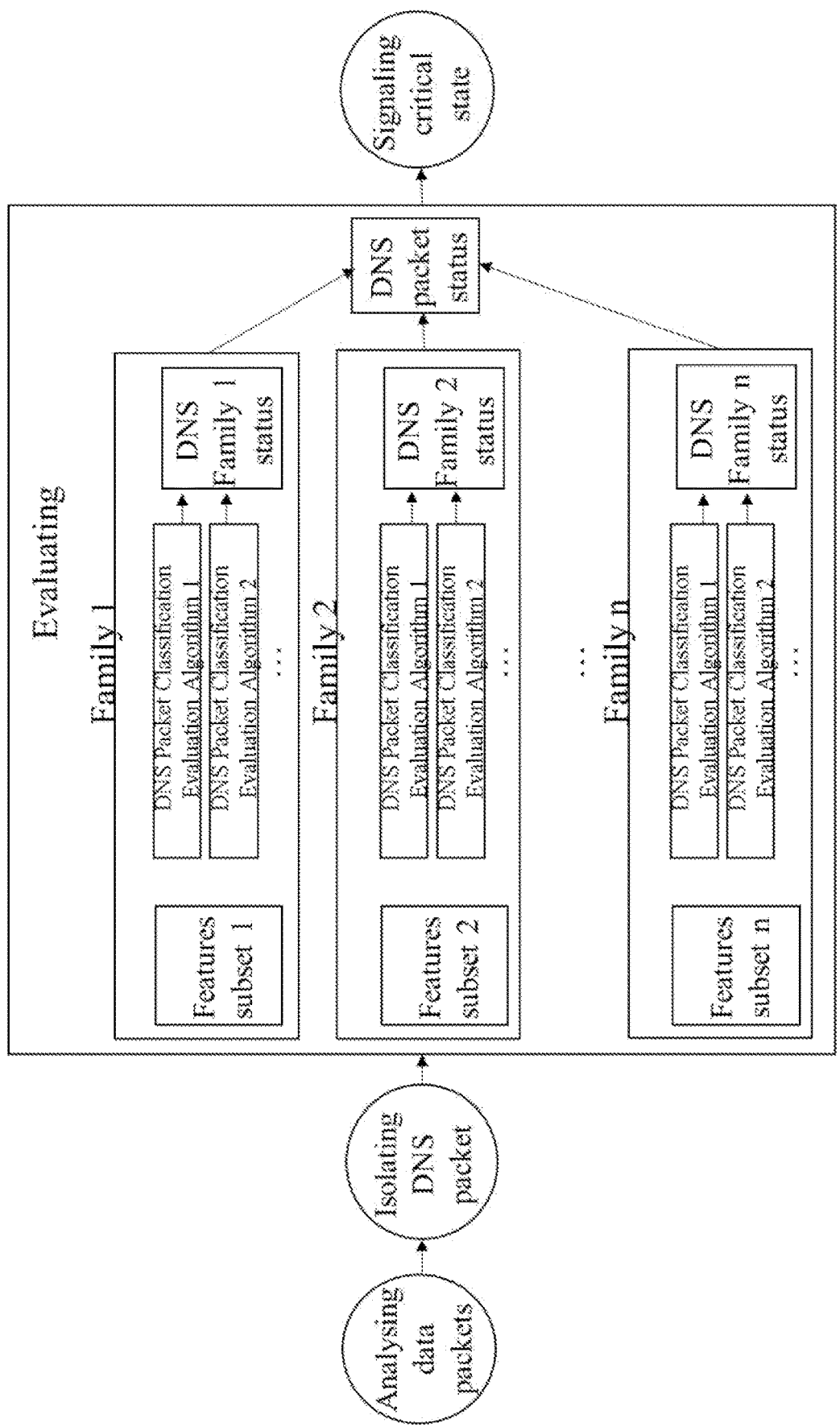
FIG. 1 shows a schematic view flowchart of the method for detecting anomalies of a DNS traffic in a network, according to the present invention.
Figure 2:
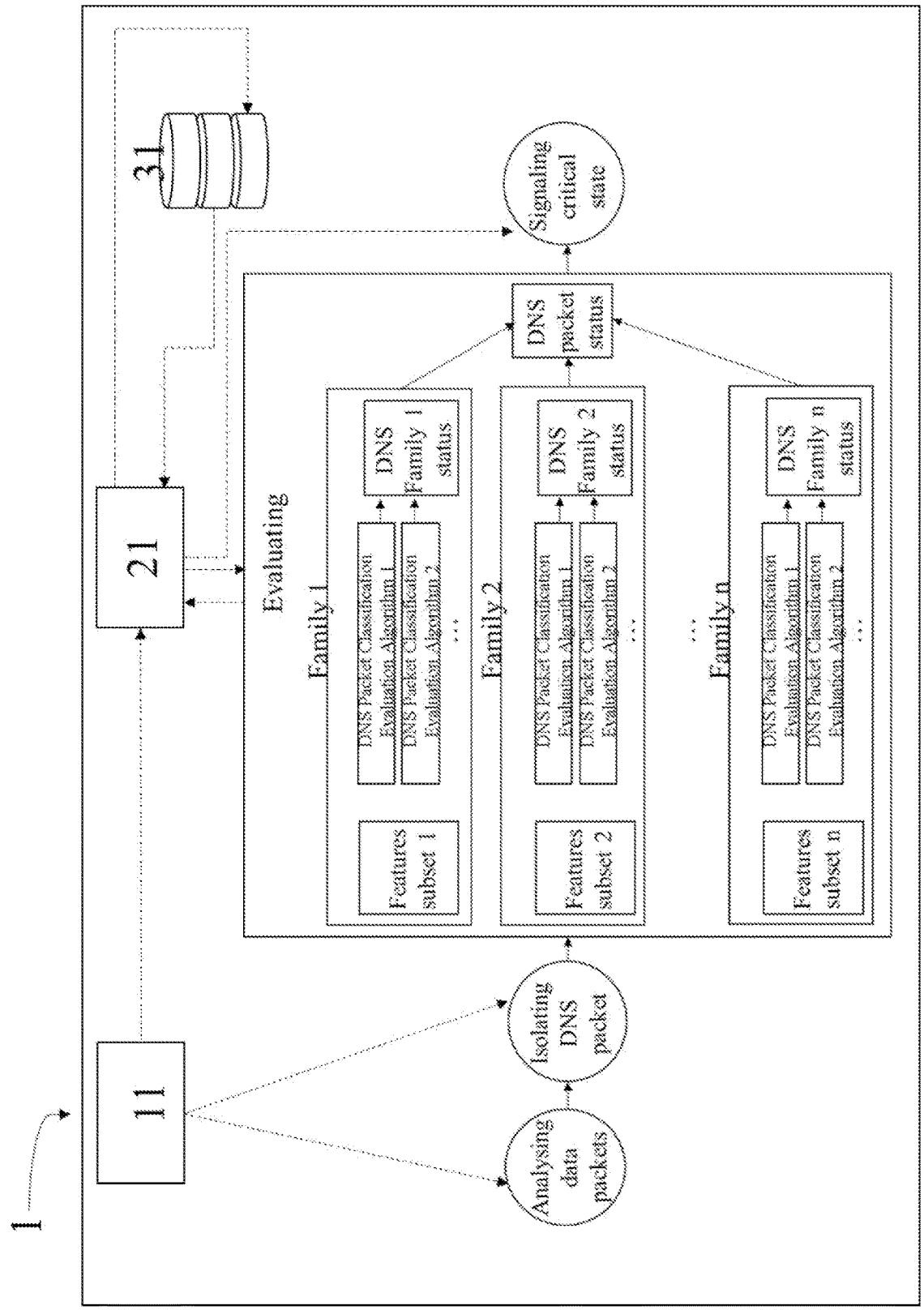
FIG. 2 shows a schematic view flowchart of the apparatus for detecting anomalies of a DNS traffic in a network, according to the present invention.

The following description will refer to the method and the apparatus according to the present invention and a single example of a data packet, but any kind and number of packets may be taken into account. In particular, FIG. 1 illustrates a schematic flowchart for the method of the present invention, while FIG. 2 illustrates the same schematic flowchart relating to the apparatus 1 of the same invention. Moreover, the operation of the anomaly detection apparatus 1 in view of the anomaly detection method, according to the present invention, is below detailed. In particular, the operation of the apparatus 1 and the application of the method according to the present invention will be described following an example of data packet analysed through interconnected modules, for example of the software type. Each module reads its data from a queue and puts the results inside another queue. If the input queue does not contain data, the module thread is stopped until the arrival of new data. The module puts its result inside the output queue. If another module is waiting for data from this queue, its thread is restarted and the data is read from the queue.

Such apparatus 1 for detecting anomalies of a DNS traffic in a network is illustrated with its main components, which are a network analyser 11, a computerized data processing unit 21 and a storage medium 31. These components, known in the art, will not be described in greater detail and further components may also be part of the apparatus.

The computerized data processing unit 21 is operatively connected either to the network analyser 11 and to the storage medium 31. In turn, the network analyser 11 is connected to the network itself thus allowing the apparatus 1 to retrieve data packets from it.

The network analyser 11 passively interacts with the network and, in use, analyses each data packets exchanged in the same network and isolates the related DNS traffic from each of the analysed data packets.

The method for detecting anomalies of a DNS traffic in a network, according to the present invention, therefore, comprises analysing, through the network analyser 11 connected to the network, each data packet exchanged in the network. Preferably, data packets are captured from the network interface by using a raw socket and put in a queue.

For each data packet exchanged in the network and then analysed, the method according to the present invention comprises isolating, through the network analyser 11, the related DNS packet. The isolating acts as DNS filter by blocking the DNS packets, or UDP packets using a well know DNS port, from the whole network. The network analyser 11 thus enables to carry out the passive interception activity of the entire network. In particular, the aforementioned analyser 11 is able to identify for each data packet exchanged through the network the portion of a DNS packet. In an alternative embodiment, the isolating of the DNS packets may be done by the computerized data processing unit.

Preferably, the isolating further comprises extracting, through the computerized data processing unit 21, all the features from each of the DNS packet. This module of features extraction, for each new data packet arrived from the queue, extracts features from the single data packet, such as size of the DNS request or response, entropy of the host name, uncommon Record Types. Data packet and features may be further stored in the storage medium 31 to define a buffer. Depending on the approach, each buffer can contain samples grouped per transaction or per domain, and the computation can be triggered at a specific time interval or when a certain number of samples is collected.

Furthermore, the assessing comprises defining, through the computerized data processing unit 21, a plurality of family subsets of the features, as extracted in the previous module. In this way, the method and the apparatus allow to define different classifications according to the different families of evaluating algorithms which are used.

The computerized data processing unit 21, in use, evaluates each of the DNS packets, as isolated in the previous module, generating a DNS packet status, and signals an anomaly of the DNS traffic when the DNS packet status defines a critical state.

The method for detecting anomalies of a DNS traffic in a network, according to the present invention, therefore, comprises first evaluating, through the computerized data processing unit 21, each of the DNS packets generating a DNS packet status and, then, signaling, through the same computerized data processing unit 21, an anomaly of the DNS traffic when the DNS packet status defines a critical state.

The storage medium 31 stores a plurality of evaluating algorithms and a critical state database.

The critical state database stores the definitions of a critical status in terms of scores or classification to be achieved. Of course, different critical statuses may be stored.

In the method for detecting anomalies of a DNS traffic in a network, according to the present invention, the computerized data processing unit 21 assesses each of the DNS packets by the plurality of evaluating algorithms, as stored in said storage medium 31. A DNS packet classification is generated for each of the evaluating algorithms. Moreover, a DNS packet status is generated by aggregating such DNS packet classifications.

Finally, according to the method and the apparatus, the computerized data processing unit 21 identifies a critical state when the DNS packet status is comprised in the critical state database, as stored in said storage medium 31.

The apparatus 1 according to the present invention therefore allows to identify a big portion of DNS misuse through a plurality of evaluating algorithms taking benefits from all evaluating algorithms and minimizing the related drawbacks, as described in greater details below.

The evaluating algorithms are preferably of different nature and, in particular, can be grouped in the families of Query-based approach type, of Transaction-based approach type, of Domain-based approach type, and of IP-based approach type.

The evaluating algorithms in the family of the Query-based approach type may comprise at least one of the Isolation Forest algorithm, the Support Vector Machine algorithm, the J48 algorithm, the Naive Bayes algorithm, the Logistic Regression algorithm, and the K-means algorithm.

In this case, the assessing further comprises defining, through the computerized data processing unit 21, a Query-based subset of the features, which can be defined as Query-based features. Such Query-based features may comprise the features of Character entropy, Total count of characters, Count of characters in sub-domain, Count of uppercase and numeric characters, Number of labels, Maximum label length and Average label length for the Isolation Forest algorithm. Moreover, such Query-based features may comprise the features of Entropy, DNS request length, IP packet sender length, IP packet response length, Encoded DNS query name length, Request application layer entropy, IP packet entropy and Query name entropy for the Support Vector Machine algorithm, the J48 algorithm and the Naive Bayes algorithm. Finally, such Query-based features may comprise the features of Entropy, Length, Characters ratio, Upper case ratio, Lower case ratio, Digit ratio, Number of sub-domains, TXT records, Upper case count, Lower case count, Number of digits, Number of spaces, Dash count, Slash count, Equal count, Other characters count and Normalized entropy for the Logistic Regression algorithm, and the K-means algorithm.

Therefore, each of the plurality of evaluating algorithms of the Query-based approach type generates a DNS packet classification from one or more features of the Query-based subset, as detailed above.

The evaluating algorithms in the family of the Transaction-based approach type may comprise at least one of the K-nearest Neighbor algorithm, the Multilayer Perceptron and the Support Vector Machine algorithm.

In this case, the assessing further comprises defining, through the computerized data processing unit 21, a Transaction-based subset of the features, which can be defined as Transaction-based features. Such Transaction-based features may comprise the features of Inter-arrival time between DNS, Packets, DNS query length, DNS response length for the K-nearest Neighbor algorithm, the Multilayer Perceptron and the Support Vector Machine algorithm.

Therefore, each of the plurality of evaluating algorithms of the Transaction-based approach type generates a DNS packet classification from one or more features of the Transaction-based subset, as detailed above.

The evaluating algorithms in the family of the Domain-based approach type may comprise the Isolation Forest algorithm.

In this case, the assessing further comprises defining, through the computerized data processing unit 21, a Domain-based subset of the features, which can be defined as Domain-based features. Such Domain-based features may comprise the features of Character entropy, Rate of A and AAAA records, Non-IP type ratio, Unique query ratio and volume, Average query length and Ratio between the length of the longest meaningful word and the subdomain length for the Isolation Forest algorithm.

Therefore, each of the plurality of evaluating algorithms of the Domain-based approach type generates a DNS packet classification from one or more features of the Transaction-based subset, as detailed above.

Finally, the evaluating algorithms in the family of the IP-based approach type may comprise at least one of the Decision Tree algorithm and the Support Vector Machine algorithm.

In this case, the assessing further comprises defining, through the computerized data processing unit 21, an IP-based subset of the features, which can be defined as IP-based features. Such an IP-based features may comprise the features of Time interval, Packet size, Sub-domain entropy and Record types for the Decision Tree algorithm and the Support Vector Machine algorithm.

Therefore, each of the plurality of evaluating algorithms of the IP-based approach type generates a DNS packet classification from one or more features of the IP-based subset, as detailed above.

According to further embodiments, different families of evaluating algorithms can also be used, and different evaluating algorithms in the same family or features as well. Moreover, the number of evaluating algorithms and families to be used, as well as of features, can vary according to technical needs. User tuning of the method and the apparatus according to the invention may allow such needs.

The following works are herewith incorporated by reference, in particular taking into account all the aforementioned evaluation algorithms and related features:

Asaf Nadler, Avi Aminov, and Asaf Shabtai, *Detection of malicious and low throughput data exfiltration over the DNS protocol*, Computers & Security, volume 80, pages 36-53, 2019.

Kenton Born and David Gustafson, *Detecting DNS tunnels using character frequency analysis*, arXiv preprint arXiv: 1004.4358, 2010.

Mahmoud Sammour, Burairah Hussin, and Iskandar Othman, *Comparative analysis for detecting DNS tunneling using machine learning techniques*, International Journal of Applied Engineering Research, volume 12, issue 22, pages 12762-12766, 2017.

Anirban Das, Min-Yi Shen, Madhu Shashanka, and Jisheng Wang, *Detection of exfiltration and tunneling over DNS*, 16th IEEE International Conference on Machine Learning and Applications (ICMLA), pages 737-742, 2017.

Jawad Ahmed, Hassan Habibi Gharakheili, Qasim Raza, Craig Russell, and Vijay Sivaraman, *Monitoring enterprise DNS queries for detecting data exfiltration from internal hosts*, IEEE Transactions on Network and Service Management, volume 17, issue 1, pages 265-279, 2019.

Franco Palau, Carlos Catania, Jorge Guerra, Sebastian Garcia, and Maria Rigaki, *DNS tunneling: A deep learning based lexicographical detection approach*, arXiv preprint arXiv:2006.06122, 2020.

Chang Liu, Liang Dai, Wenjing Cui, and Tao Lin, *A byte-level CNN method to detect DNS tunnels*, 38th IEEE International Performance Computing and Communications Conference (IPCCC), pages 1-8, 2019.

Maurizio Aiello, Maurizio Mongelli, and Gianluca Papaleo, *DNS tunneling detection through statistical fingerprints of protocol messages and machine learning*, International Journal of Communication Systems, volume 28, issue 14, pages 1987-2002, 2015.

Enrico Cambiaso, Maurizio Aiello, Maurizio Mongelli, and Gianluca Papaleo, *Feature transformation and mutual information for DNS tunneling analysis*, 8th IEEE International Conference on Ubiquitous and Future Networks (ICUFN), pages 957-959, 2016.

Maurizio Aiello, Maurizio Mongelli, Enrico Cambiaso, and Gianluca Papaleo, *Profiling DNS tunneling attacks with PCA and mutual information*, Logic Journal of the IGPL, volume 24, issue 6, pages 957-970, 2016.

Maurizio Aiello, Maurizio Mongelli, Marco Muselli, and Damiano Verda, *Unsupervised learning and rule extraction for domain name server tunneling detection*, Internet Technology Letters, volume 2, issue 2, pages 85-90, 2019.

Saeed Shafieian, Daniel Smith, and Mohammad Zulkernine, *Detecting DNS tunneling using ensemble learning*, International Conference on Network and System Security, pages 112-127, 2017.

Jingkun Liu, Shuhao Li, Yongzheng Zhang, Jun Xiao, Peng Chang, and Chengwei Peng, *Detecting DNS tunnel through binary-classification based on behavior features*, IEEE Trustcom/BigDataSE/ICESS, pages 339-346, 2017.

The computerized data processing unit 21 assesses each of the DNS packets, as isolate, by two or more of evaluating algorithms generating a DNS packet classification for each of the evaluating algorithms as previously detailed. The assessing module utilizes a particular subset of the extracted features, for example, one or more features of the aforementioned type, to create a vector that feeds a Machine Learning algorithm. Each algorithm classifies the vector, returning its prediction about the nature of the network traffic represented in the vector.

Each of the plurality of evaluating algorithms generates a DNS packet classification from a sole family subset. In the Feature Selection modules, each Feature Selection module selects a subset of the extracted features depending on the related family algorithm and passes it to each evaluating algorithm. For this operation, each algorithm plugin classification is executed in a specific thread and the module stops its execution waiting for the result.

The computerized data processing unit 21 aggregates the DNS packet classifications generating the DNS packet status and identifies a critical state when the DNS packet status is comprised in the critical state database. In order to compare the outputs of different evaluating algorithms belonging to the same family, the Decision Module implements a decision strategy that can be of different types. In particular, the aggregating may comprise generating, through the computerized data processing unit 21, a DNS family status grouping the DNS packet classifications of a same family subset according to a predefined family-logic evaluation. In the same manner, the aggregating may comprise generating, through the computerized data processing unit 21, the DNS packet status grouping the DNS family status according to a predefined packet-logic evaluation.

Therefore, the method according to the present invention allows to aggregate evaluation of different nature made up from different families of evaluating algorithms used.

The predefined packet-classification evaluation may comprise a majority voting evaluation, wherein the DNS packet status is defined by the status of the majority number of the DNS family status, and wherein the critical state is identified when the majority number of the DNS family status relates to the critical status. Therefore, in this case, the majority voting evaluation allows to equally balance each of the evaluating algorithms involved.

Furthermore, in addition or alternatively, the predefined packet-classification evaluation may comprise a score voting evaluation, wherein a score is assigned to the DNS packet classifications and wherein the DNS packet status is defined by the status of the greater score by summing homogeneous statuses, and wherein the critical state is identified when the greater score relates to the critical status. In this case, by scoring each DNS packet classification, it is possible to define a different weight, and importance as well, to each evaluating algorithms involved.

Finally, in addition or alternatively, the predefined packet-classification evaluation comprises an evil-win evaluation, wherein the DNS packet status is defined by a selected status if at least one DNS family status corresponds to the selected status, and wherein the critical state is identified when the selected status relates to the critical status. In this case, the evil-win evaluation approaches with the stronger identification of a critical status, wherein a high false positive rate can be tolerated.

The choice of the predefined packet-classification evaluation depends on the desired performances. In fact, during a test phase, the architecture can be tuned according to specific needs, taking into account the following metrics:

True Positive (TP), the number of inputs that contain a tunnel and are correctly classified as critical;

True Negative (TN), the number of inputs that do not contain a tunnel and are correctly classified as not critical;

False Positive (FP), the number of inputs that do not contain a tunnel and are wrongly classified as critical;

False Negative (FN), the number of inputs that contain a tunnel and are wrongly classified as not critical;

Accuracy, the number of correctly classified inputs on the total inputs, which is (TP+TN)/(TP+TN+FP+FN).

Maintaining a reasonable margin of accuracy, the decision logic can be chosen to privilege the number of false negative or the number of false positive. For example, the choice of an evil-win decision logic is more cautious increasing the possibility of detecting a tunnel attack, but also increasing the number of false positives. The compromise between the false positives and the false negatives is a decision delegated to the user.

An aggregator module may also be used to group a decision about the critical status. This module may be represented by a graphical user interface that shows the alarms belonging to different families and the information useful to a human operator to enhance its situational awareness.

In the following, an example is detailed. A plurality of DNS packets is collected by the network analyser 11 and put in the queue of the features extraction module. Each packet is analysed by the same network analyser 11 and if it contains a request to a specific domain, it is sent to a specific queue. The features are computed over this queue once at a time, for example, one per minute. Many different features could be extracted, among which the number of packets, the average length, the frequency of a specific query type, and the average inter-arrival time between the request and the response. Afterwards, the feature selection modules feed the considered ML evaluation algorithms with the properly selected features by the computerized data processing unit 21. For example, Algorithm 1 (e.g. Isolation forest algorithm) utilizes only the first three mentioned features. This vector of three features is sent to Algorithm 1 that returns his prediction. Meanwhile, Algorithm 2 (e.g. Neural Network), utilizing a different subset of features, has performed the same task. Algorithm 1 notices a DNS tunnel, while Algorithm 2 does not notice any attacks.

The decision module may work according to different packet-classification evaluation, such as an evil-win evaluation. In that case, the computerized data processing unit 21 sends an alarm which highlights that a DNS tunnel attack has been noticed at time "t" involving the domain over which the features have been computed, since the Algorithm 1 has noted a DNS tunnel. Therefore, the computerized data processing unit 21 provides an alert relating to the critical state of the analysed data packet.

If more than a single evaluation algorithm per family is exploited, the computerized data processing unit 21 calculates a DNS family status for each family by grouping the DNS packet classifications of a same family subset. Afterwards, the computerized data processing unit 21 proceeds with the calculation of the DNS packet status by grouping said DNS family status in a manner similar to a simplified description with a single evaluation algorithm in each family.

The method and the apparatus for detecting anomalies of a DNS traffic in a network, according to the present invention, are capable of minimizing the aforementioned drawbacks.

They allow to identify a big portion of DNS misuse through a plurality of evaluating algorithms taking benefits from all evaluating algorithms and minimizing the related drawbacks.

The method and the apparatus according to the invention define, therefore, a modular, scalable and queryable architecture which ingests multiple data packets proving a plurality of operation at the same time.

The method and the apparatus can be distributed on a scalable number of machines accepting queries regardless of the number of data packets.

The invention claimed is:

1. A method for detecting anomalies of a DNS traffic in a network comprising:
analysing, through a network analyser (11) connected to said network, each data packets exchanged in said network;
isolating, through said network analyser (11), from each of said analysed data packets a related DNS packet;
evaluating, through a computerized data processing unit (21), each of said DNS packets generating a DNS packet status;
signaling, through said computerized data processing unit (21), an anomaly of said DNS traffic when said DNS packet status defines a critical state;
wherein said evaluating further comprises:
assessing, through said computerized data processing unit (21), each of said DNS packet by a plurality of evaluating algorithms generating a DNS packet classification for each of said evaluating algorithms;
aggregating, through said computerized data processing unit (21), said DNS packet classifications generating said DNS packet status; and
wherein said critical state is identified when said DNS packet status is comprised in a critical state database stored in a storage medium (31); wherein said isolating further comprises extracting, through said computerized data processing unit (21), all the features from each of said DNS packet, wherein said assessing further comprises defining, through said computerized data processing unit (21), a plurality of family subsets of said features, wherein each of said plurality of evaluating algorithms generates a DNS packet classification from a sole family subset, wherein said aggregating further comprises generating, through said computerized data processing unit (21), a DNS family status grouping said DNS packet classifications of a same family subset according to a predefined family-logic evaluation, and wherein said aggregating further comprises generating, through said computerized data processing unit (21), said DNS packet status grouping said DNS family status according to a predefined packet-logic evaluation.

2. The method for detecting anomalies of a DNS traffic according to claim 1, wherein said predefined packet-classification evaluation comprises a majority voting evaluation,
wherein said DNS packet status is defined by the status of the majority number of said DNS family status, and
wherein said critical state is identified when said majority number of said DNS family status relates to said critical status.

3. The method for detecting anomalies of a DNS traffic according to claim 1, wherein said predefined packet-classification evaluation comprises a score voting evaluation,
wherein a score is assigned to said DNS packet classifications and wherein said DNS packet status is defined by the status of the greater score by summing homogeneous statuses, and
wherein said critical state is identified when said greater score relates to said critical status.

4. The method for detecting anomalies of a DNS traffic according to claim 1, wherein said predefined packet-classification evaluation comprises an evil-win evaluation,
wherein said DNS packet status is defined by a selected status if at least one DNS family status corresponds to said selected status, and
wherein said critical state is identified when said selected status relates to said critical status.

5. The method for detecting anomalies of a DNS traffic according to claim 1, wherein said evaluating algorithms comprise at least one algorithm of Query-based approach type,
wherein said assessing further comprises defining, through said computerized data processing unit (21), a Query-based subset of said features, and
wherein each of said plurality of evaluating algorithms of a Query-based approach type generates a DNS packet classification from one or more features of said Query-based subset.

6. The method for detecting anomalies of a DNS traffic according to claim 5, wherein said algorithms of a Query-based approach type comprise at least one of the Isolation Forest algorithm, the Support Vector Machine algorithm, the J48 algorithm, the Naive Bayes algorithm, the Logistic Regression algorithm, and the K-means algorithm.

7. The method for detecting anomalies of a DNS traffic according to claim 1, wherein said evaluating algorithms comprise at least one algorithm of a Transaction-based approach type,
wherein said assessing further comprises defining, through said computerized data processing unit (21), a Transaction-based subset of said features, and wherein each of said plurality of evaluating algorithms of a Transaction-based approach type generates a DNS packet classification from one or more features of said Transaction-based subset.

8. The method for detecting anomalies of a DNS traffic according to claim 7, wherein said algorithms of a Transaction-based approach type comprise at least one of the K-nearest Neighbor algorithm, the Multilayer Perceptron and Support Vector Machines algorithm.

9. The method for detecting anomalies of a DNS traffic according to claim 1, wherein said evaluating algorithms comprise at least one algorithm of a Domain-based approach type,
wherein said assessing further comprises defining, through said computerized data processing unit (21), a Domain-based subset of said features, and
wherein each of said plurality of evaluating algorithms of a Domain-based approach type generates a DNS packet classification from one or more features of said Domain-based subset.

10. The method for detecting anomalies of a DNS traffic according to claim 9, wherein said algorithms of a Domain-based approach type comprise the Isolation Forest algorithm.

11. The method for detecting anomalies of a DNS traffic according to claim 1, wherein said evaluating algorithms comprise at least one algorithm of an IP-based approach type,
wherein said assessing further comprises defining, through said computerized data processing unit (21), an IP-based subset of said features, and
wherein each of said plurality of evaluating algorithms of an IP-based approach type generates a DNS packet classification from one or more features of said IP-based subset.

12. The method for detecting anomalies of a DNS traffic according to claim 11, wherein said algorithms of an IP-based approach type comprise at least one of the Decision Tree algorithm and the Support Vector Machine algorithm.

13. An apparatus (1) for detecting anomalies of a DNS traffic in a network comprising a network analyser (11) to be connected to said network, computerized data processing unit (21) operatively connected to said network analyser (11) and storage medium (31) operatively connected to said data computerized data processing unit (21),
wherein said network analyser (11), in use, analyses each data packets exchanged in said network and isolates from each of said analysed data packets a related DNS packet,
wherein said computerized data processing unit (21), in use, evaluates each of said DNS packets generating a DNS packet status, and signals an anomaly of said DNS traffic when said DNS packet status defines a critical state,
wherein said storage medium (31) stores a plurality of evaluating algorithms and a critical state database,
wherein said computerized data processing unit (21) assesses each of said DNS packet by said plurality of evaluating algorithms, generating a DNS packet classification for each of said evaluating algorithms, and aggregates said DNS packet classifications generating said DNS packet status; and
wherein said computerized data processing unit (21) identifies said critical state when said DNS packet status is comprised in said critical state database wherein said computerized data processing unit (21), in said isolating, further comprises extracting all the features from each of said DNS packet, wherein said computerized data processing unit (21), in said assessing, further comprises defining a plurality of family subsets of said features, wherein said computerized data processing unit (21) generates a DNS packet classification from a sole family subset for each of said plurality of evaluating algorithms generates, wherein said computerized data processing unit (21), in said aggregating, further comprises generating a DNS family status grouping said DNS packet classifications of a same family subset according to a predefined family-logic evaluation, and wherein said computerized data processing unit (21), in said aggregating, further comprises generating said DNS packet status grouping said DNS family status according to a predefined packet-logic evaluation.

\* \* \* \* \*